Figures 1, 2:
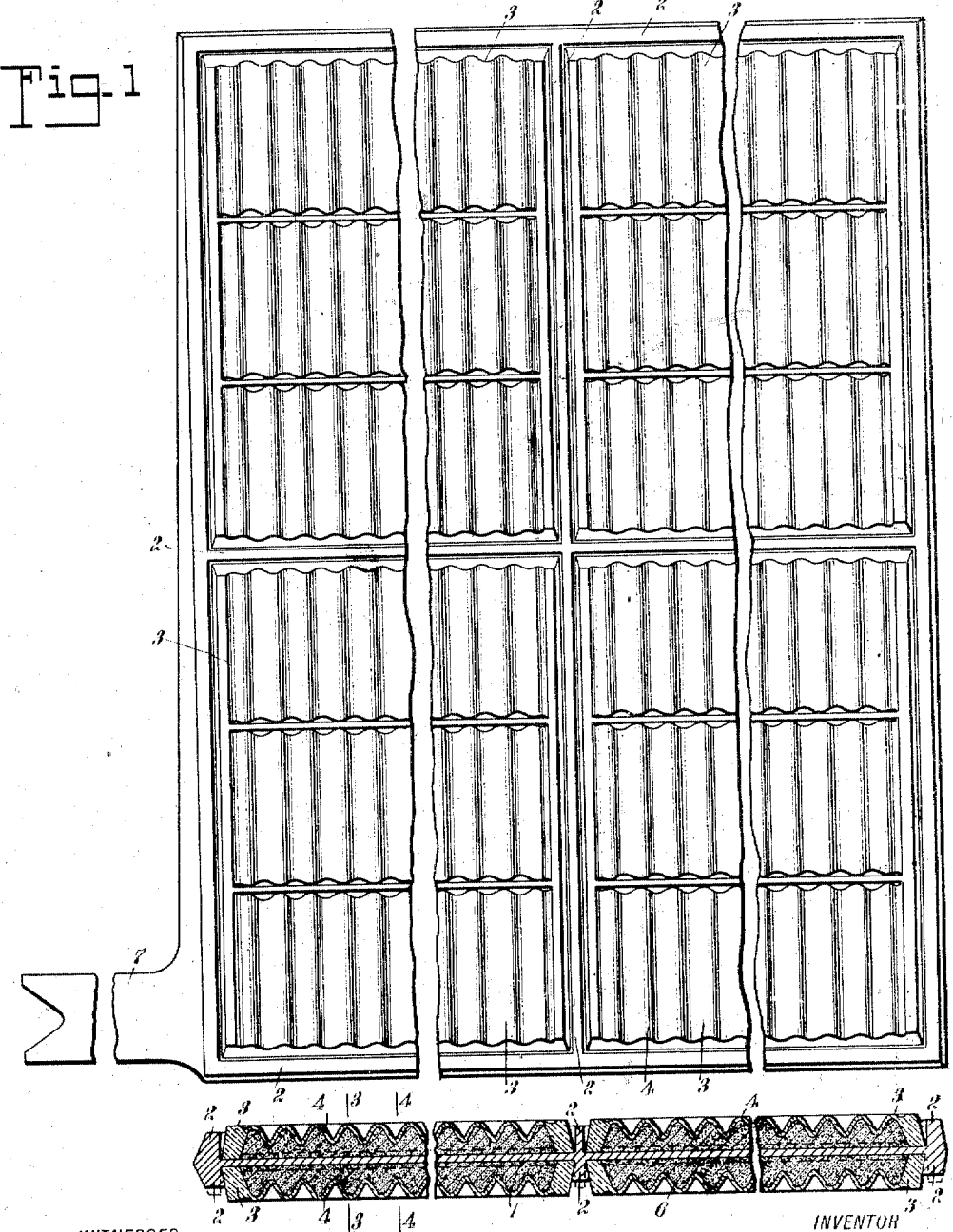

P. J. KAMPERDYK.
STORAGE BATTERY ELECTRODE.
APPLICATION FILED DEC. 6, 1909.

983,062.

Patented Jan. 31, 1911.

2 SHEETS—SHEET 1.

WITNESSES:
J. A. Brophy
H. Whiting.

INVENTOR
Pierre J. Kamperdyk
BY Munn & Co
ATTORNEYS

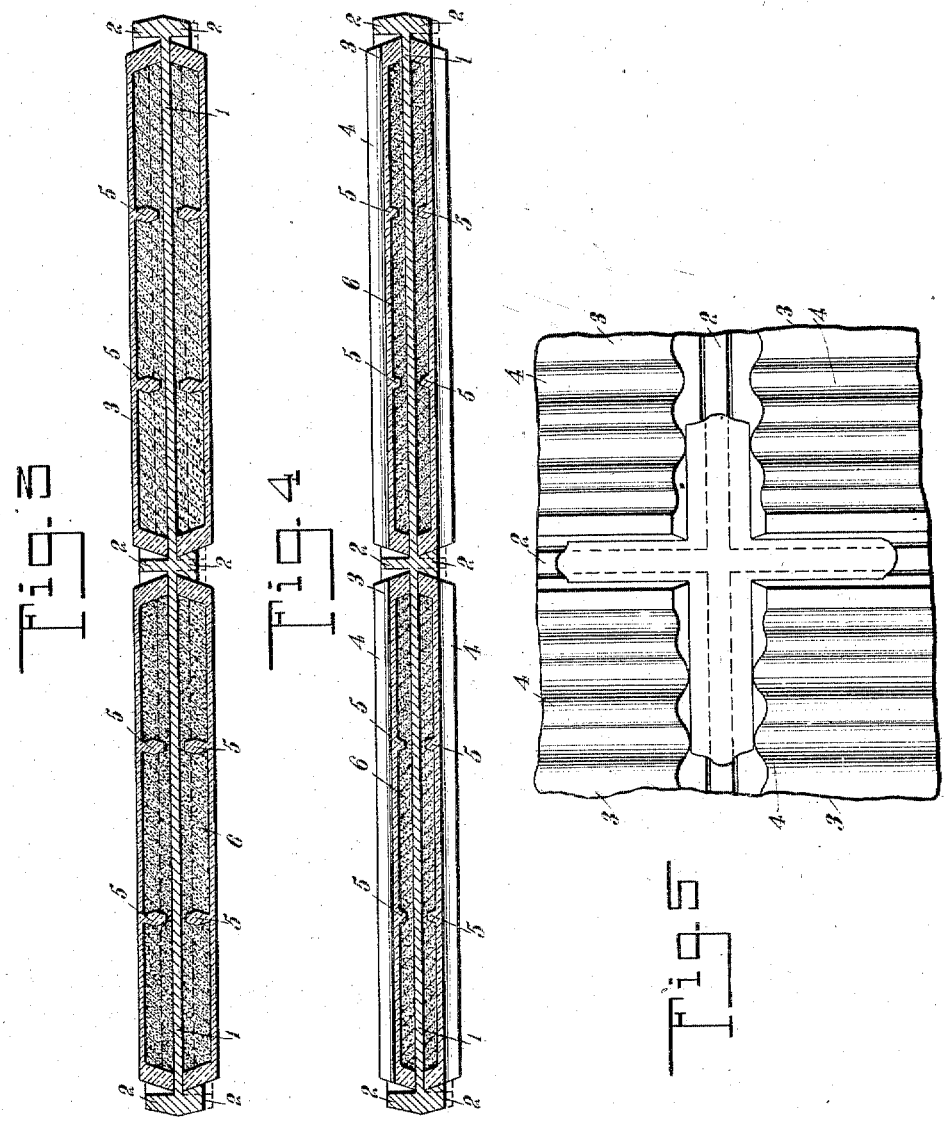

UNITED STATES PATENT OFFICE

PIERRE J. KAMPERDYK, OF NEW YORK, N. Y.

STORAGE-BATTERY ELECTRODE.

983,062.   Specification of Letters Patent.   Patented Jan. 31, 1911.

Application filed December 6, 1909. Serial No. 531,555.

*To all whom it may concern:*

Be it known that I, PIERRE J. KAMPERDYK, a subject of the King of Belgium, and a resident of the city of New York, borough of Manhattan, in the county and State of New York, have invented a new and Improved Storage-Battery Electrode, of which the following is a full, clear, and exact description.

This invention relates to a new and improved active plate for storage or secondary batteries.

An object of this invention is to provide a device which will be simple in construction, strong, durable, inexpensive to manufacture, and having a maximum exposed surface for a given magnitude.

A further object of this invention is to provide a durable storage battery electrode, in which the active material is absolutely prevented from falling off, presenting a greatly increased area to the electrolyte, and making short-circuiting absolutely impossible.

Another object of this invention is a special construction of electrode in which the entire expansion is divided into a number of independent unit cells, preventing thereby buckling of the electrode.

Another object of this invention is to build up an electrode composed of a number of independent units, so that if any one of them should get out of order the electrode is only slightly impaired, said electrode being formed of a number of independent unit cells filled with active material, and formed of thin porous walls, so that the active material can be acted on by the electrolyte in such a manner as to avoid supplementary internal resistance.

It is well known that in the common form of storage battery electrodes heretofore known, the active material, which is held in specially designed grids, will slowly but surely fall out of the same, after which these electrodes are rendered useless. To overcome this objectionable feature, and to prevent short-circuiting, in the present invention the active material is placed in cups of highly porous and yet solid material, such as very porous unglazed porcelain. These cups are fastened upon conducting plates, with which the active material comes in intimate contact, and which, furthermore, serve to hold the cups in their respective positions.

For this purpose the invention consists of an electrode for secondary batteries, which comprises a conducting plate, a plurality of cups of porous material provided with corrugated faces, edge ribs and intermediate longitudinal intersecting ribs, each cup being filled with active material, and means for holding the cups and active material in face contact with the conducting plate.

The invention consists further of an electrode for secondary batteries, which comprises a conducting plate provided with edge ribs and longitudinal transverse intersecting ribs, a plurality of cups of porous material provided with corrugated faces, edge ribs and longitudinal intersecting ribs, each cup being filled with active material and being placed in one of the spaces or cells formed on the conducting plate, and means for holding the cups and active material in contact with the conducting plate.

The invention consists further of certain details of construction which will be fully described hereinafter and finally pointed out in the claims.

Reference is to be had to the accompanying drawings forming a part of this specification, in which similar characters of reference indicate corresponding parts in all the views, and in which—

Figure 1 is a fragmentary side view in elevation: Fig. 2 is a vertical transverse section: Fig. 3 is a longitudinal section, taken at the apex of one of the corrugations in the cups, on the line 3—3 in Fig. 2; Fig. 4 is a view similar to Fig. 3, taken at the middle of one of the valleys of the corrugations in the cups, on the line 4—4 in Fig. 2; and Fig. 5 is a fragmentary side view showing the manner of securing the cups to the conducting plate.

Referring more particularly to the separate parts of the device, 1 indicates the conducting plate of the electrode which may be of any suitable form and material, but preferably consists of a sheet of lead having longitudinally and transversely-arranged ribs 2 extending from each side of the plate 1 along the edges thereof and midway of the edges thereof, so as to form reinforcing locking ribs whereby the plate 1 is divided into sections. In each of the sections, there is provided on each side of the plate 1, a cup 3, which is preferably made of some highly porous material, such as unglazed porcelain. By porous material is intended material capable of permitting the flow of the fluid electrolyte therethrough, but imperforated so as to prevent the transudation of solid material.

The cups 3 are formed on their faces with thin shallow corrugations 4 and with ribs 5 5 extending along the edges and longitudinally across said corrugations intermediately between the side ribs, so that but small additional internal resistance is offered to the current and a greatly increased surface exposed to the electrolyte, thus decreasing the internal resistance of the electrode. The edge ribs and intermediate ribs 5 serve for strengthening the cups and prevent their warping during the firing operation. Each cup is filled with a suitable active material 6 of any known composition, such as lead oxid. The outer sides of the edge ribs are preferably made inclined or beveled, or with some retaining edge, so that when the ribs 2 of the conductive plate 1 are pressed or melted down over said beveled edges a wedge lock is obtained for securely holding the cups in position on the conducting plate, with the faces of the ribs and the active material in direct and intimate contact with the conducting plate.

In the figures, some of the ribs are shown in their raised position before being pressed or melted down, and some of them are shown in their pressed or melted down position, so that the action may be fully understood. The active material in the cups 3 is thus forced into intimate contact with the plate 1, making the electrical connection practically perfect. The plate 1 is provided with an integral lug 7, which extends therefrom, whereby connection may be made to one of the terminals of the battery. As the active material is inclosed on all sides by the edge ribs of the cups forming direct contact with the conducting plate 1, the active material is fully inclosed and cannot drop out of the cells of the conducting plate or be washed out or boiled out of the cups. The active material is placed in intimate contact with the conducting plate and surrounded by the edge ribs of each cup so as to be inclosed on all sides, so as to render it absolutely impossible that the active material can be pushed or dropped out by expansion at any point of the cup. Two or more of the electrodes formed of a conducting plate and cups filled with active material on opposite sides can be assembled and tightly strapped together so as to hold the small porous cups firmly on the conducting plates.

It will thus be seen from the above description that an electrode of low resistance, great strength and efficiency, and with the maximum surface exposed to the electrolyte, is formed in a cheap and simple manner.

While I have shown the plate provided with eight cups, four on each side, I may vary the number of these cups to be used on one plate according to the size and capacity required, and they may be secured to the plate in any other suitable manner. These cups may be, further, made of any size and form without departing from the general inventive feature of this application. Further, two of these cups may be juxtaposed together along their edge ribs relatively to the conducting plate between them and extending outside of the cups. Several of these pairs of juxtaposed cups filled with active material and a conducting plate between them may then be placed adjacent to each other into a suitable mold and a supporting and locking conducting frame, provided with a lug, cast around them, producing thereby the desired complete electrode.

While I have shown the supporting plate as formed of a solid sheet extending between the cups, I may also provide a plate of any suitable form or shape, having a plurality of openings extending therethrough.

Having thus described my invention, I claim as new and desire to secure by Letters Patent:—

1. In an electrode for secondary batteries, the combination, with a conducting plate having edge ribs and intermediate intersecting ribs, of a plurality of porous cups located in the cells between said ribs, said cups being provided with edge ribs on all their sides, corrugated face and longitudinal ribs and filled with an active material at the side adjacent to the conducting plate.

2. In an electrode for secondary batteries, the combination, with a conducting plate provided with ribs extending around its edges and intermediate intersecting ribs, of porous cups placed in the cells formed by said ribs, said cups being provided with edge ribs on all their sides and intermediate longitudinal ribs, and filled with active material, and means for securing said cups to the conducting plate.

3. In an electrode for secondary batteries, the combination, with a conducting plate provided with edge ribs and intermediate intersecting ribs, of porous cups filled with active material and retained on said conducting plate, said cups being beveled on all their sides and provided with corrugated faces and longitudinal strengthening ribs, and means for securing said cups in the cells of the conducting plate.

In testimony whereof I have signed my name to this specification in the presence of two subscribing witnesses.

PIERRE J. KAMPERDYK.

Witnesses:
HORATIO WHITING,
PHILIP L. ROLLHAUS.